US009625791B2

(12) United States Patent
Harrison

(10) Patent No.: US 9,625,791 B2
(45) Date of Patent: *Apr. 18, 2017

(54) SWIVEL CAMERA MOUNT

(71) Applicant: GoPro, Inc., San Mateo, CA (US)

(72) Inventor: Ryan Harrison, El Granada, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,417

(22) Filed: May 9, 2016

(65) Prior Publication Data

US 2016/0252801 A1    Sep. 1, 2016

Related U.S. Application Data

(63) Continuation of application No. 14/604,518, filed on Jan. 23, 2015, now Pat. No. 9,360,742.

(51) Int. Cl.
*H04N 5/225* (2006.01)
*G03B 17/56* (2006.01)
*F16M 11/06* (2006.01)
*F16M 11/20* (2006.01)
*F16M 13/02* (2006.01)
*G03B 17/08* (2006.01)
*B60R 11/02* (2006.01)

(52) U.S. Cl.
CPC .......... *G03B 17/561* (2013.01); *F16M 11/06* (2013.01); *F16M 11/2014* (2013.01); *F16M 13/02* (2013.01); *G03B 17/08* (2013.01); *H04N 5/2252* (2013.01); *A45F 2200/0533* (2013.01); *B60R 11/02* (2013.01); *F16M 2200/022* (2013.01); *F16M 2200/028* (2013.01)

(58) Field of Classification Search
CPC .... H04N 5/2252; G03B 17/08; G03B 17/561; F16M 11/06; F16M 11/2014; F16M 13/02; F16M 2200/022; F16M 2200/028; A45F 2200/0533
See application file for complete search history.

(56) References Cited

U.S. PATENT DOCUMENTS

| 8,970,689 | B2* | 3/2015 | Campbell | H04N 5/2252 |
| | | | | 348/335 |
| 9,033,596 | B2* | 5/2015 | Samuels | F16F 7/00 |
| | | | | 396/421 |
| 9,229,299 | B1* | 1/2016 | Morlon | G03B 17/561 |
| 9,360,742 | B1* | 6/2016 | Harrison | G03B 17/561 |
| 2005/0265711 | A1* | 12/2005 | Heibel | B60R 11/04 |
| | | | | 396/419 |

(Continued)

*Primary Examiner* — Lin Ye
*Assistant Examiner* — John H Morehead, III
(74) *Attorney, Agent, or Firm* — Fenwick & West LLP

(57) ABSTRACT

A swivel camera mount is configured to attach a camera to a mount base which, in turn, may be secured to sport equipment, musical instruments, vehicles, and the like. The swivel camera mount includes an inner rotating component that couples to a camera or camera housing and allows a user to rotate a camera within a horizontal plane. The inner rotating component is securely coupled within an outer sleeve component by a coupling mechanism that allows the swivel camera mount and a coupled camera or camera housing to couple to the mount base. Additionally, the outer sleeve component includes protrusions that allow the swivel mount component to pivot in one or more vertical planes.

20 Claims, 10 Drawing Sheets

(56) References Cited

U.S. PATENT DOCUMENTS

| | | | | |
|---|---|---|---|---|
| 2008/0107414 A1* | 5/2008 | Showalter | ............. | F41G 11/004 396/429 |
| 2012/0240444 A1* | 9/2012 | Russell | .................. | F41C 27/00 42/90 |
| 2014/0098241 A1* | 4/2014 | Stout | ...................... | H04N 5/222 348/169 |
| 2016/0269629 A1* | 9/2016 | Martin | ............... | H04N 5/23238 |

* cited by examiner

SWIVEL CAMERA MOUNT

CROSS REFERENCE TO RELATED APPLICATIONS

This application is a continuation of U.S. application Ser. No. 14/604,518, filed Jan. 23, 2015, now U.S. Pat. No. 9,360,742, which is incorporated by reference in its entirety.

BACKGROUND

Technical Field

This disclosure relates to a camera system, and more specifically, to the selection of a camera mounting system in a camera system.

Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera, and couples to a camera mount. A user experience with a camera mount can be diminished by difficult or inefficient mechanisms for securing and releasing the camera mount to an apparatus. In addition, the user experience can be further complicated if the camera mount does not allow for securing the camera housing at a desired angle or orientation for taking photographs.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure 4A:
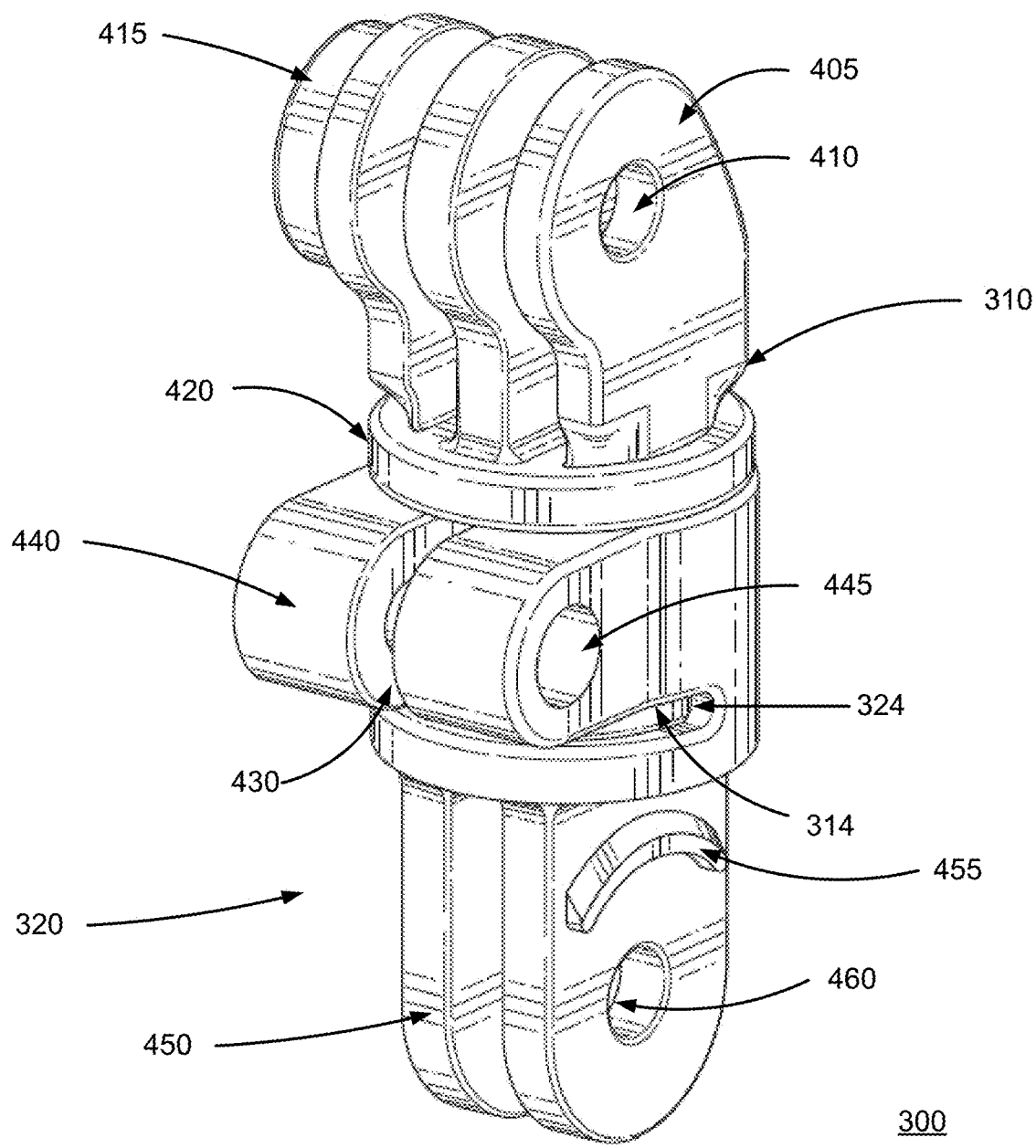
Figure 4B:
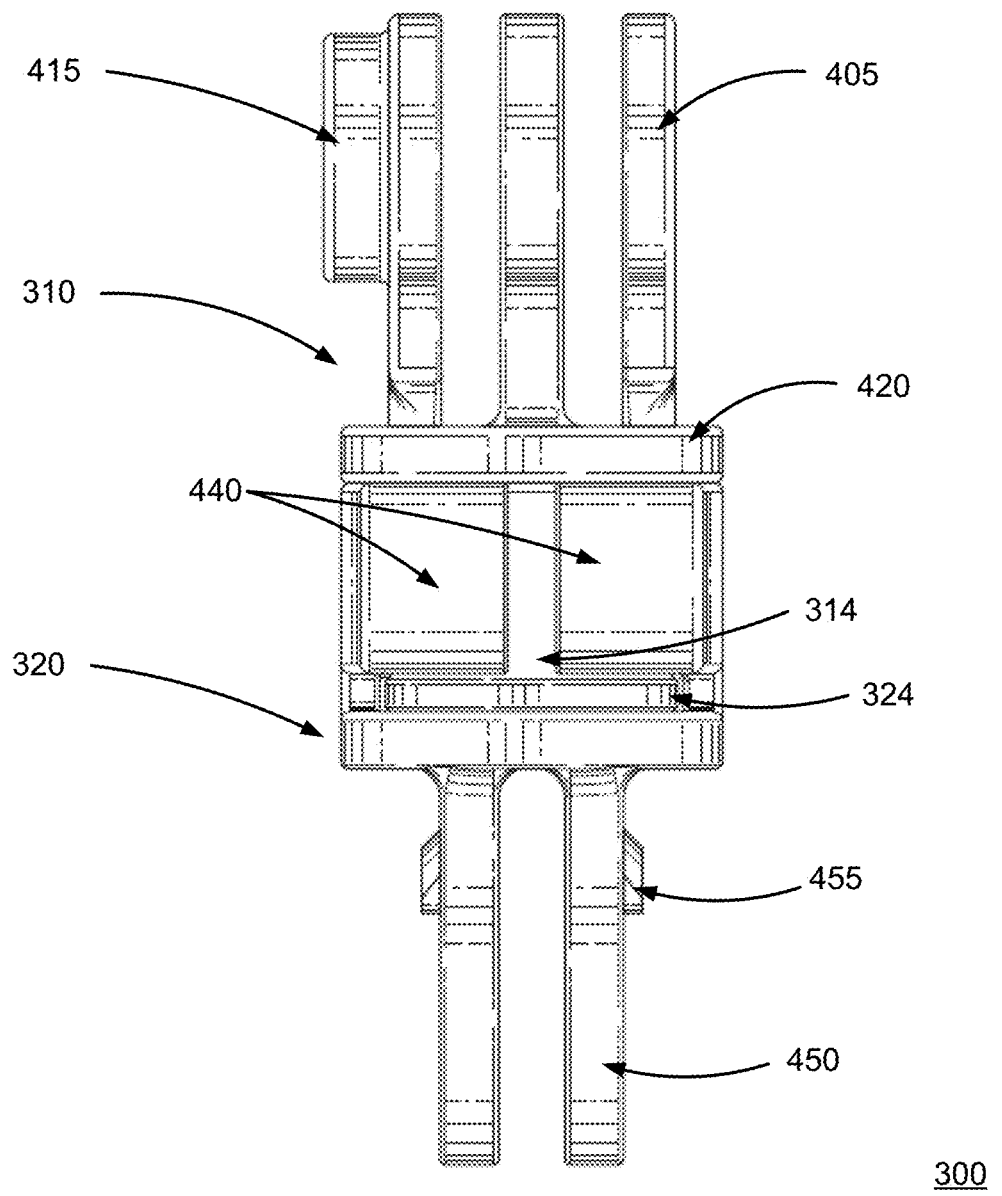
Figure 4C:
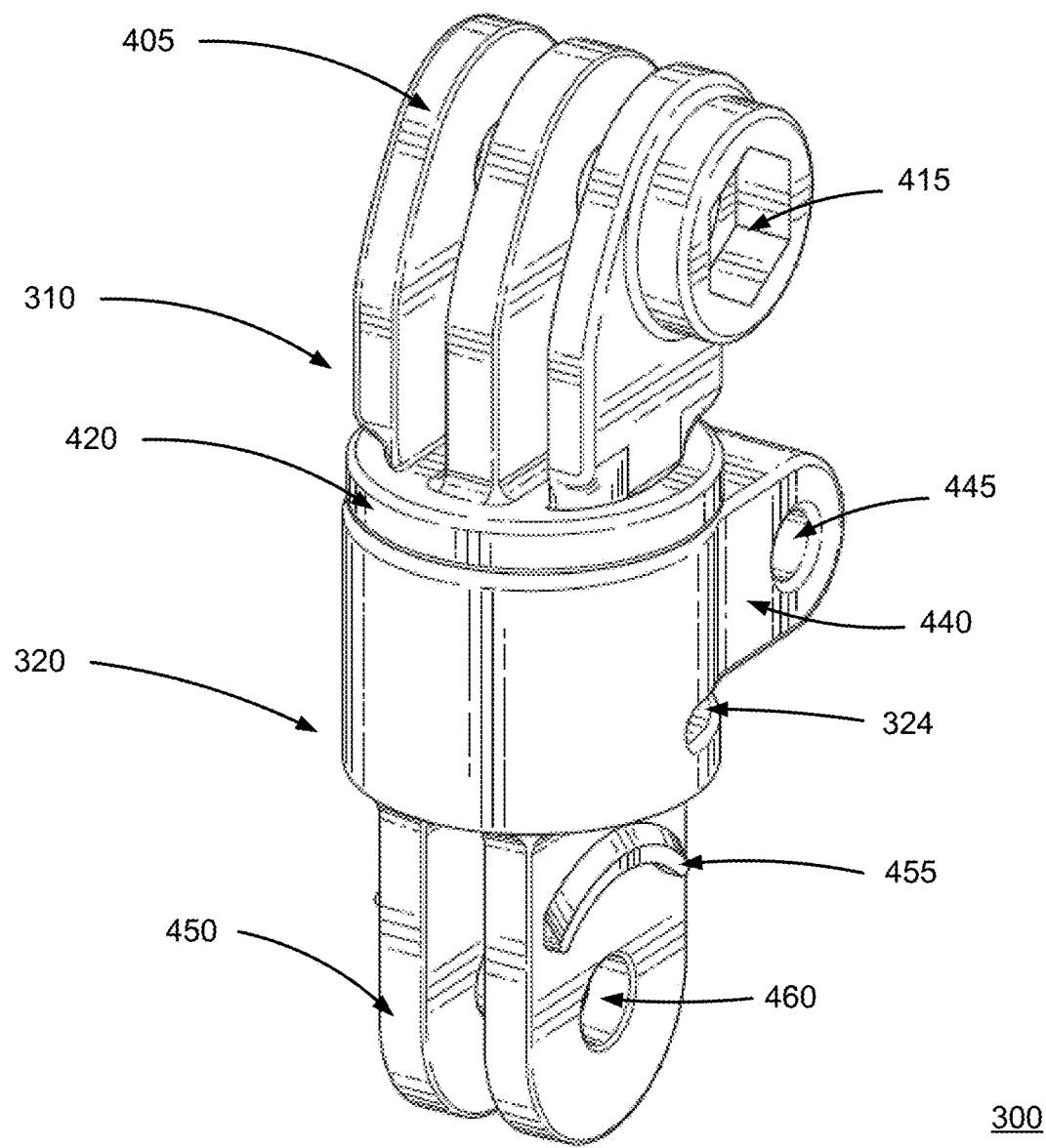

FIGS. 4a, 4b, and 4c illustrate a swivel camera mount with a first locking mechanism, according to one embodiment.

Figure 5:
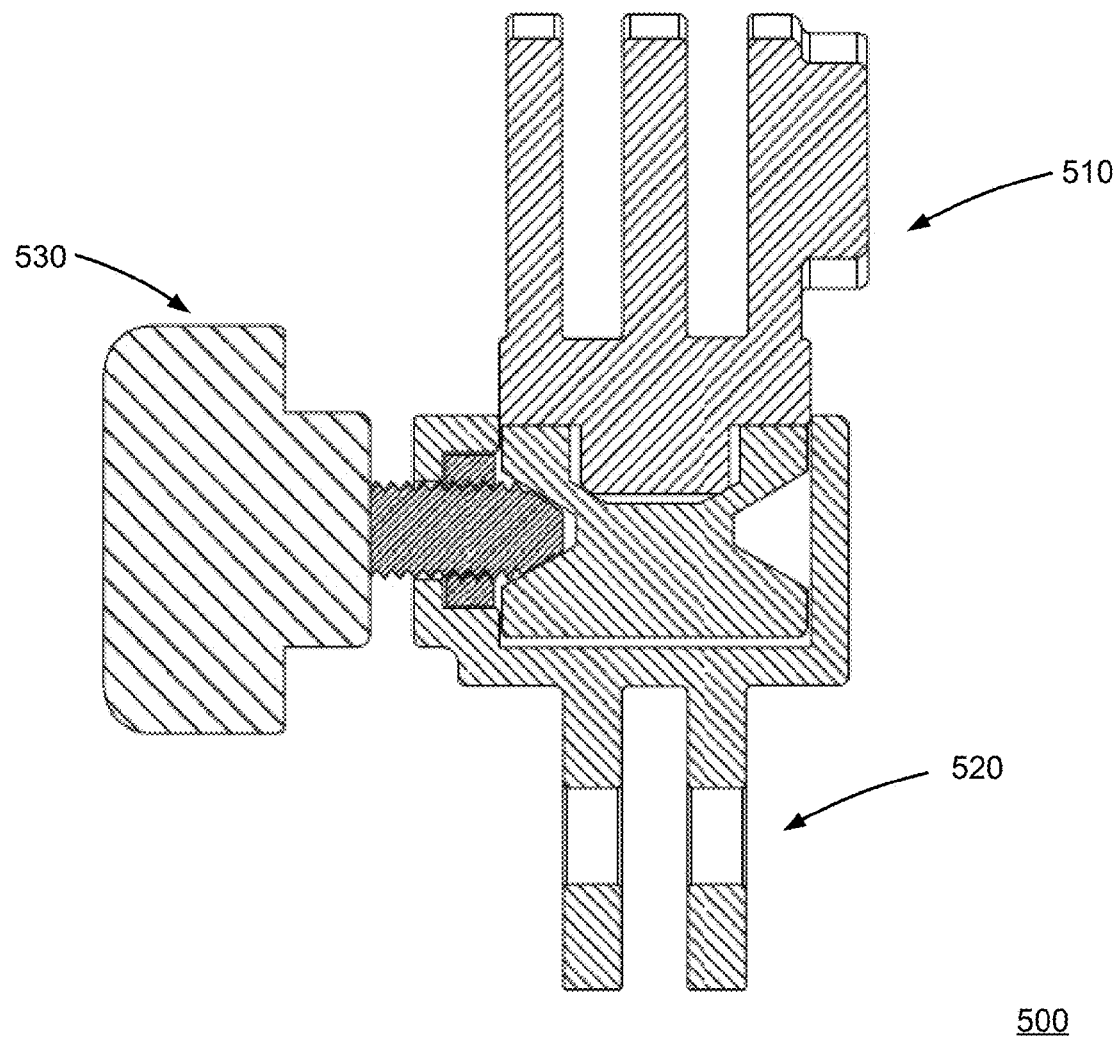

FIG. 5 illustrates a swivel camera mount with a second locking mechanism, according to one embodiment.

Figure 6:
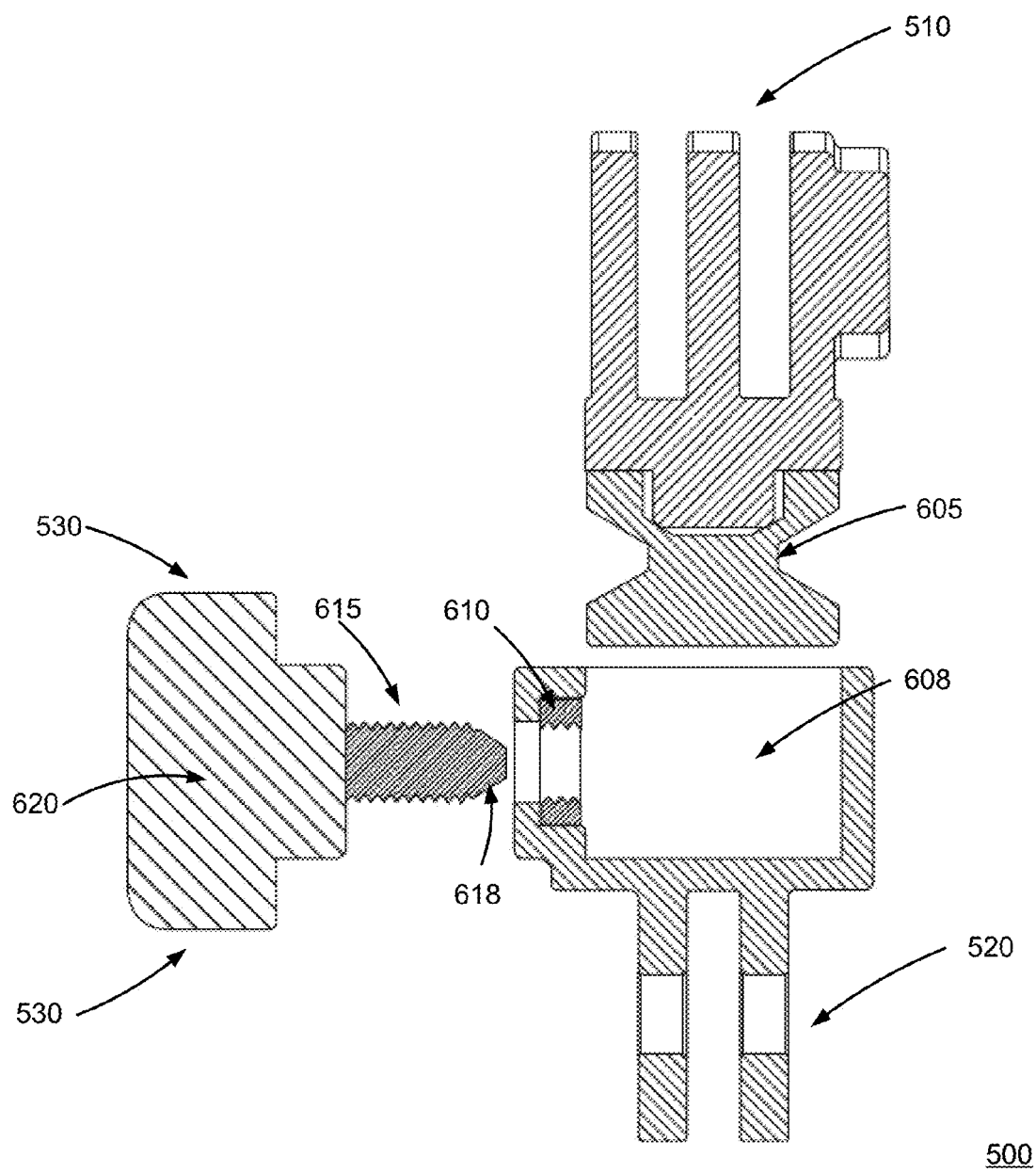

FIG. 6 illustrates an exploded view of the swivel camera mount of FIG. 5, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
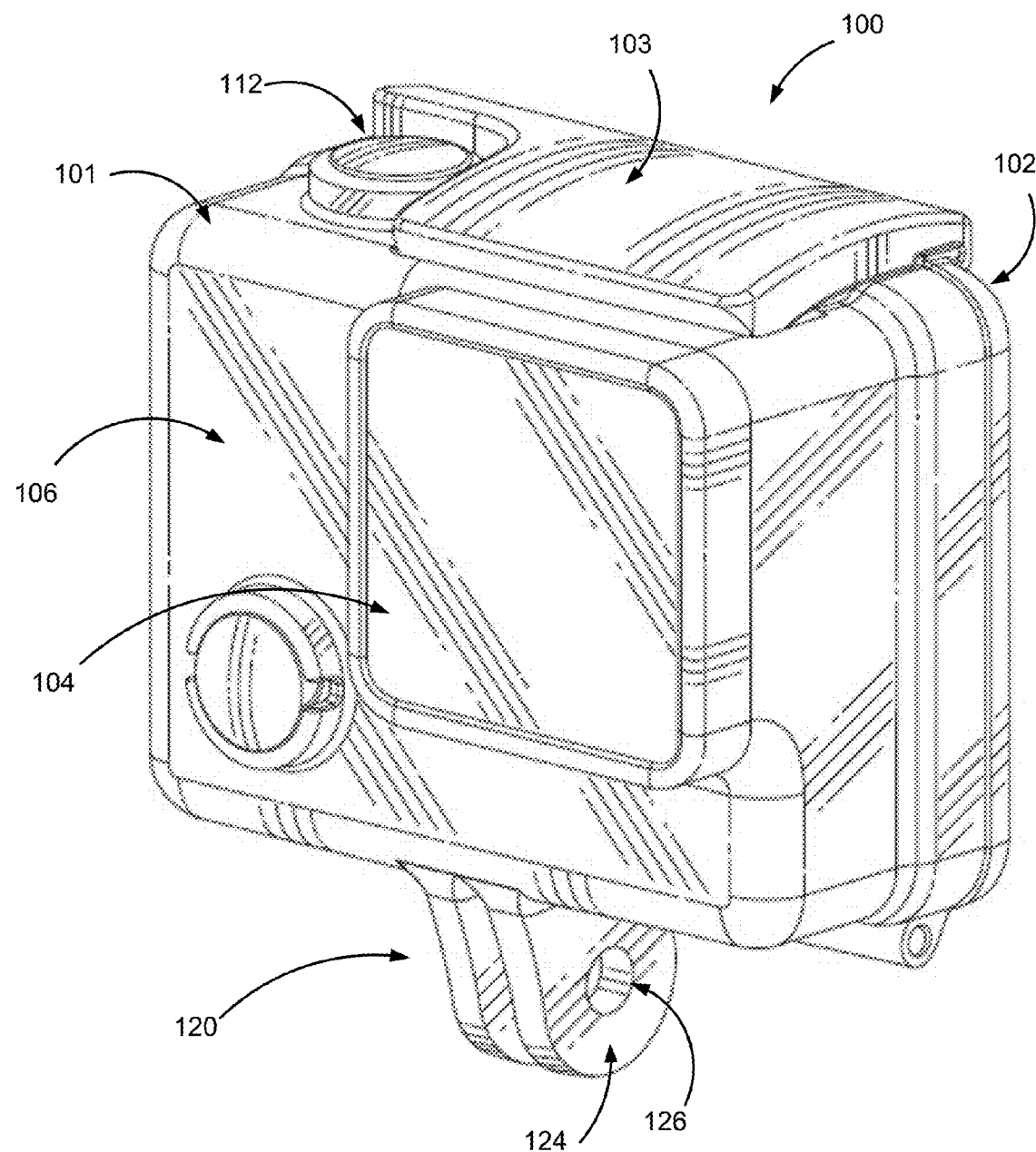
FIG. 1a illustrates a perspective view of a camera system, according to one embodiment.
Figure 1B:
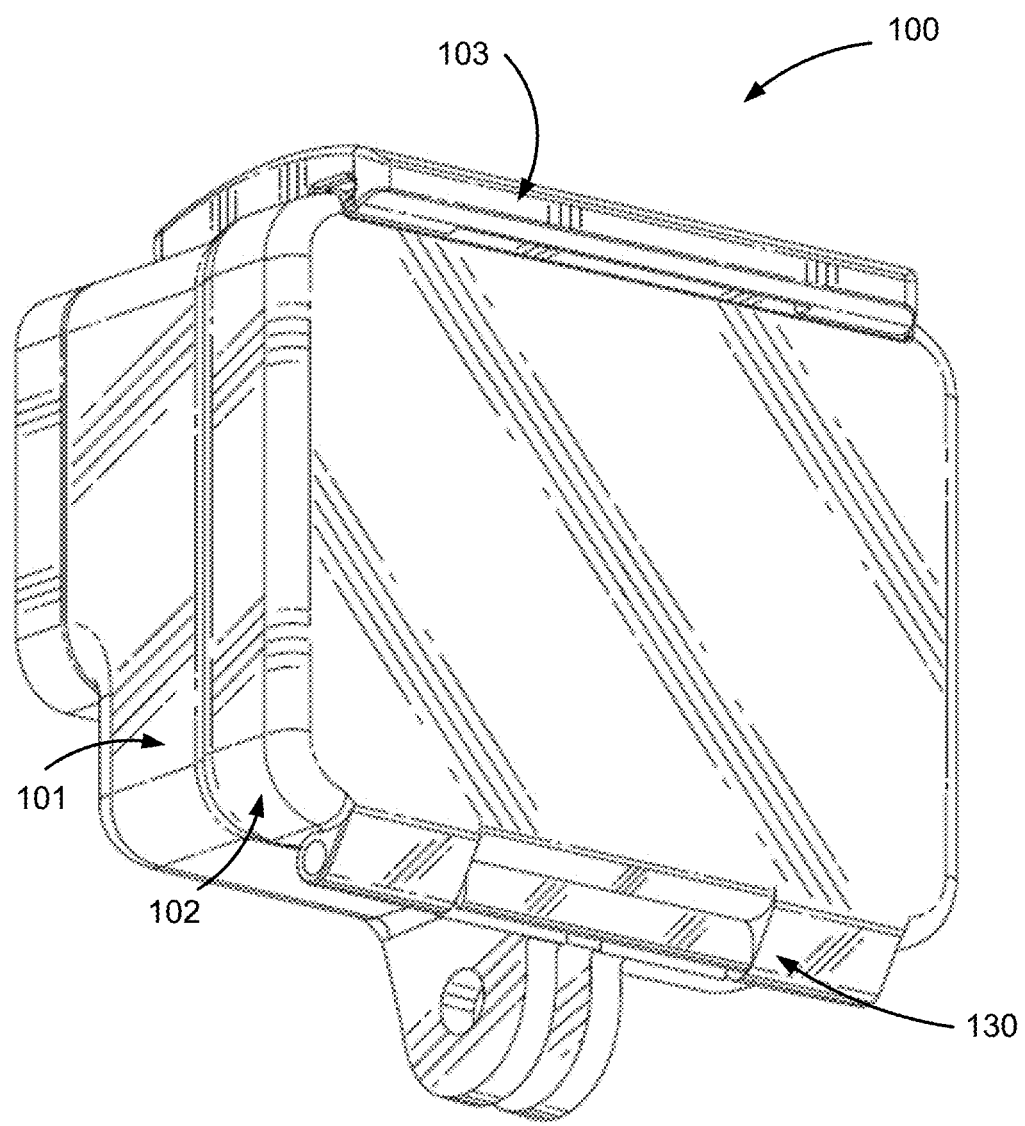
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
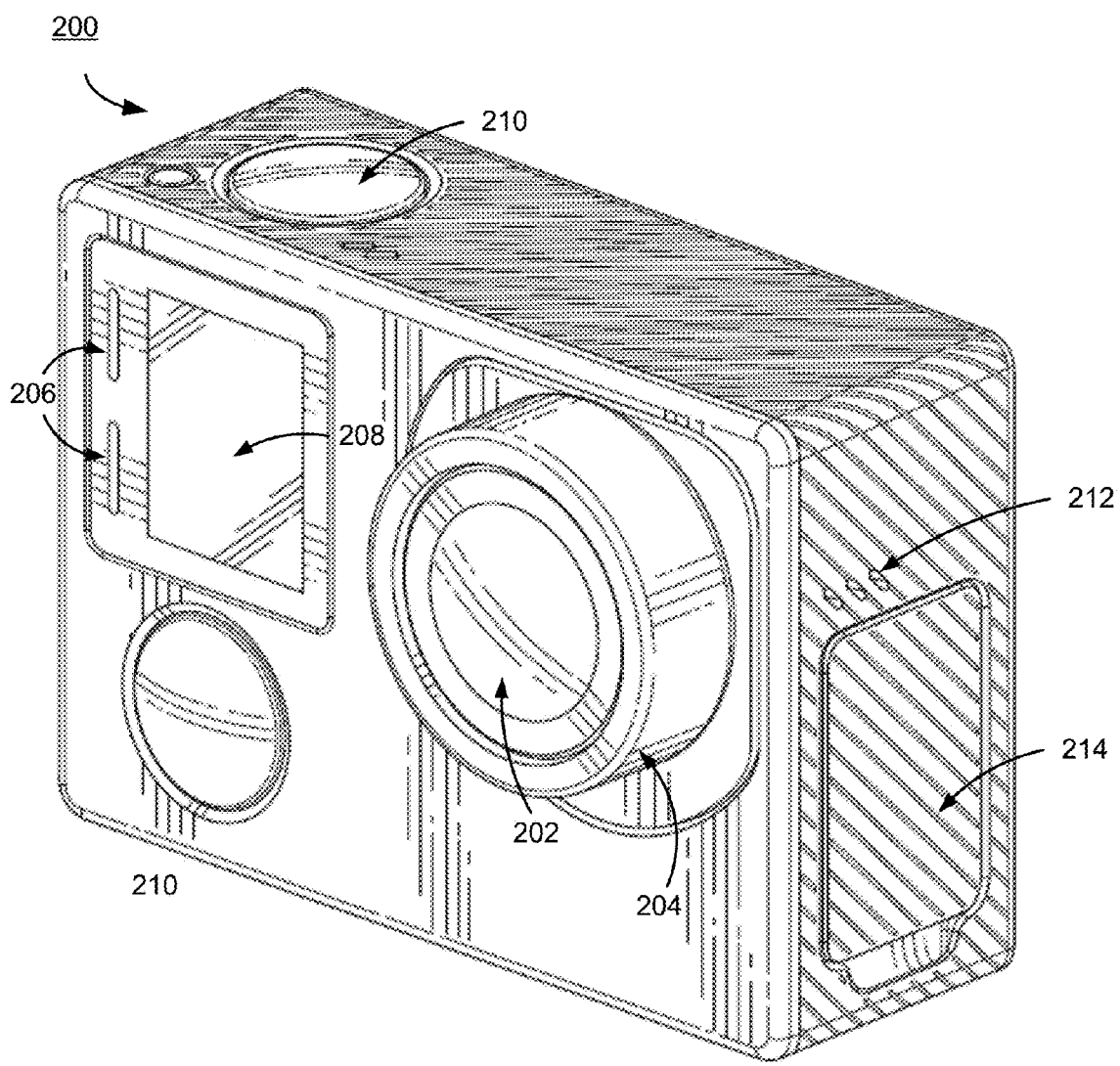
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
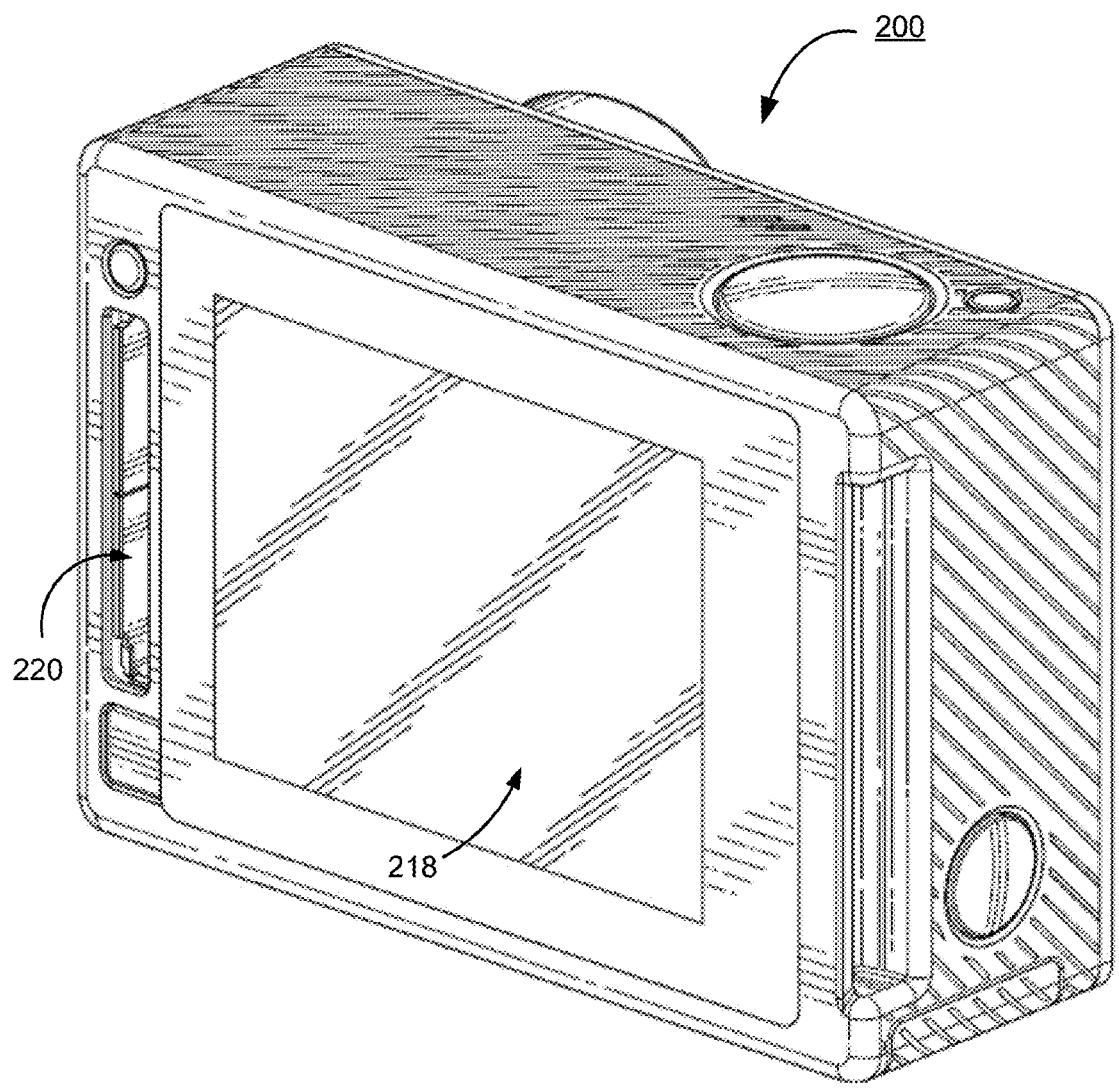
FIG. 2b illustrates a perspective view of a rear of a camera for use with the camera system, according to one embodiment.

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Swivel Camera Mount

Figure 3:
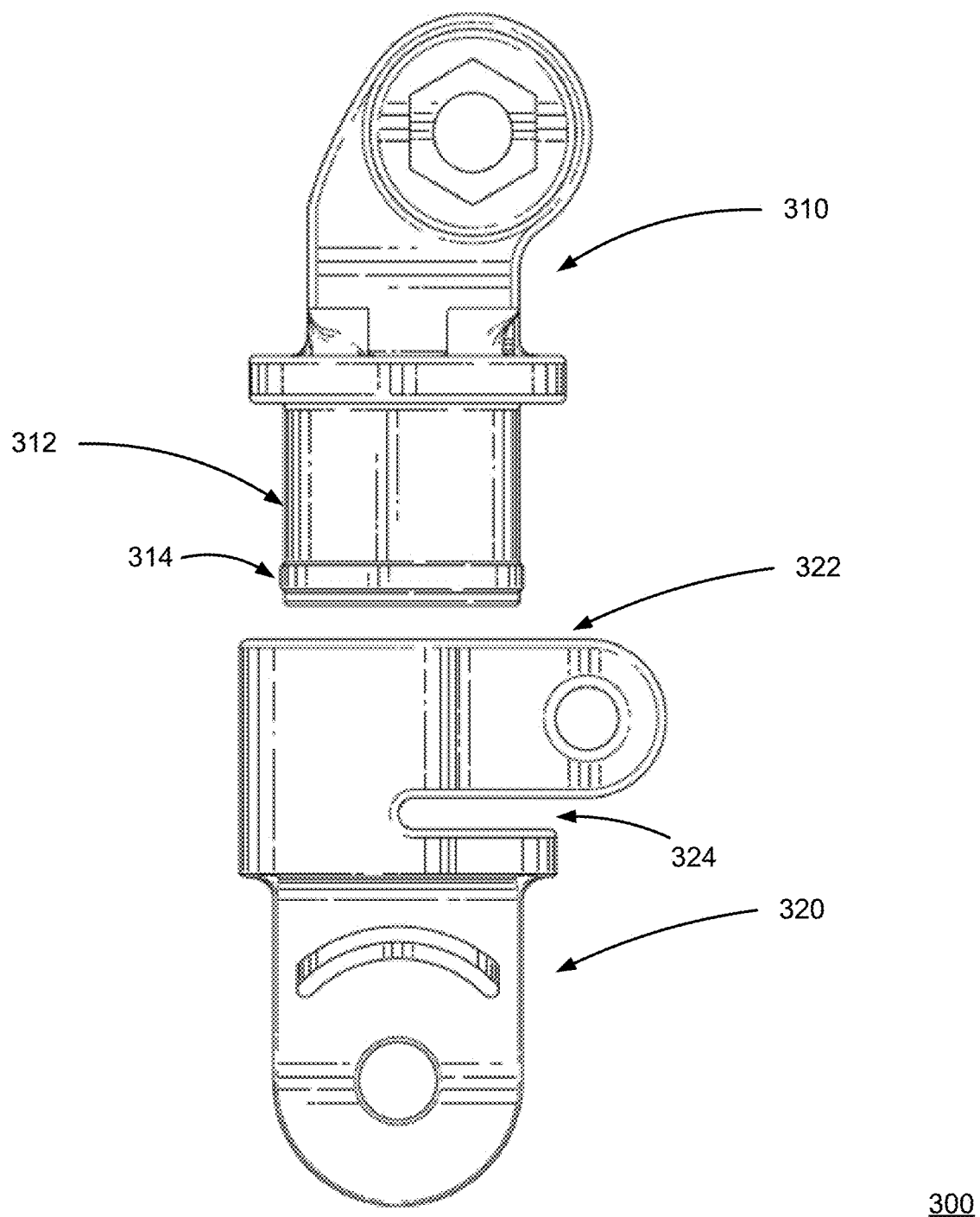
FIG. 3 illustrates an exploded view of a swivel camera mount with a first locking mechanism, according to one embodiment.

FIG. 3 illustrates an exploded view of a swivel mount component 300 with a first locking mechanism, according to one embodiment. In the embodiment of FIG. 3, the swivel mount component 300 includes an inner rotating component 310, and an outer sleeve component 320. The inner rotating component 310 is configured to be at least partially enclosed and within the outer sleeve component 320. As described below, the inner rotating component 310 can couple to a camera housing (such as the camera housing 100 of FIGS. 1a and 1b), which in turn can securely enclose a camera (such as the camera 200 of FIGS. 2a and 2b), thereby coupling the camera to the inner rotating component 310. The inner rotating component 310 can rotate in a horizontal plane defined by a top surface 322 of the outer sleeve component 320, and can allow a camera housing coupled to the inner rotating component 310 to pivot up to 90 degrees or more within one or more vertical planes relative to the inner rotating component 310.

As described below, the outer sleeve component 320 can be configured to securely couple to a base mount component (not illustrated), and can pivot up to 90 degrees or more within one or more vertical planes relative to the base mount component. The base mount component may in turn be coupled to an object such as sports equipment, a vehicle, a surface, or a user thereby coupling a camera coupled to the inner rotating component 310 (which in turn is coupled to the outer sleeve component 320 coupled to the base mount component) to the object. This enables the rotation and pivoting of the camera relative to the object, allowing a user to configure the direction, angle, and orientation of the camera. As used herein, the swivel mount component 300 can be referred to as a "lower mount component" 300, and a housing securing a camera and configured to be coupled to the swivel mount component 300 can be referred to herein as an "upper mount component."

The inner rotating component 310, in various embodiments, can be fixedly or removably coupled within the outer sleeve component 320, and can be rotated to face any direction in a 360 degree plane parallel to the horizontal plane defined by the top surface 322 of the outer sleeve component 320. Specifically, a cylindrical shaft 312 of the inner rotating component 310 can be inserted and secured within a reciprocal cavity of the outer sleeve component 320 until a shaft lip 314 (which extends around an outer circumference of the cylindrical shaft) is aligned with and protrudes (at least in part) outward from a reciprocal opening 324 within the body of the outer sleeve component (in some embodiments, the reciprocal opening 324 extends up to 40% or more around the circumference of the outer sleeve component 320). As described below, in some embodiments, the frictional force between an outer surface of the cylindrical shaft 312 and an inner surface of the reciprocal cavity of the outer sleeve component 320 can be applied to secure or fix the orientation of the inner rotating component 310 relative to the outer sleeve component 320. Likewise, the frictional force can be reduced to allow for the rotation of the inner rotating component 310 to a new orientation relative to the outer sleeve component 320, and can be re-applied in order to fix the inner rotating component 310 at the new orientation.

FIGS. 4a, 4b, and 4c illustrate the swivel camera mount with a first locking mechanism, according to one embodiment. The inner rotating component 310 includes a set of evenly spaced protrusions 405 that extend vertically from a protrusion buttress 420. Each protrusion 405 includes a hole 410 (e.g., a pin hole), such that a pin, screw, or other securing device ("pin" hereinafter) may be inserted through each hole 410 unimpeded. In one embodiment, the pin is a turntable handscrew, while in other embodiments the pin is a threaded screw, a rod, a clip, or other similar device. A first outer protrusion 405 includes a raised nut cap guide 415 through which a nut cap is inserted, allowing the pin to be screwed into the nut cap, securing the pin within the holes 410. A reciprocal set of protrusions of an upper mount component (such as the protrusions 120 of FIGS. 1a and 1b) with a reciprocal set of holes can interlock with the set of protrusions 405 such that the holes 405 and the reciprocal holes align, allowing a pin to pass through the aligned holes, securing the upper mount component to the swivel mount component 300. In a loosened configuration, the pin enables an upper mount component to rotate around the pin relative to the swivel mount component 300. In a tightened configuration, the pin secures the upper mount component at a fixed angle relative to the swivel mount component 300.

The outer sleeve component 320 includes an additional set of evenly spaced protrusions 450 that extend vertically from the bottom surface of reciprocal cavity. Each protrusion 450 includes a hole 460 (e.g., a pin hole), such that a pin, screw, or other securing device ("pin" hereafter) may be inserted through each hole 460 unimpeded. In a one embodiment, the fastening pin is a turntable handscrew, while in other embodiments the pin is a threaded screw, a rod, a clip, or other similar device. A reciprocal set of protrusions of a base mount component (not illustrated) with a reciprocal set of holes can interlock with the set of protrusions 450 such that the holes 460 and the reciprocal holes align, allowing a pin to pass through the aligned holes, securing the swivel mount component 300 to the base mount component. In a loosened configuration, the pin enables the swivel mount component 300 to rotate around the pin relative to the base mount component 300. In a tightened configuration, the pin secures the swivel mount component at a fixed angle relative to the base mount component. Flexion tracks 455, located on the outer surface of the protrusions 450 provide guides for the swivel mount component 300 to pivot around the pin.

The cylindrical shaft 312 extends from the protrusion buttress 420. The buttress 420 and the shaft lip 314, in one embodiment, are flattened continuous components made of the same material (e.g. polymer plastic) as the cylindrical shaft 312. In some embodiments, the components of the inner rotating component 310 are molded as a single component. In some embodiments, the diameter of the cylindrical shaft 312 is substantially less than the diameter of the protrusion buttress 420 and the shaft lip 314, allowing the inner rotating component 310 to be inserted into a reciprocal cavity of the outer sleeve component 320. While the cylindrical shaft 425 is secured within the reciprocal cavity, the protrusion buttress 420 abuts atop surface 322 of the outer sleeve component 310. Likewise, while the cylindrical shaft 425 is secured with the reciprocal cavity of the outer sleeve component 320, the shaft lip 314, protruding from the reciprocal opening 324, abuts a surface of the reciprocal opening 324 and prevents longitudinal separation of the inner rotating component 310 from the outer sleeve component 320. Additionally, as described above, the cylindrical shaft 425 allows the inner rotating component 310 (and thus a camera coupled to the inner rotating component 310) to swivel relative to the outer sleeve component 320.

The outer sleeve component 320 includes two protrusions 440 on either side of a separation 430, protruding outward from the outer sleeve component 320. Each protrusion 440 includes a clamp pin hole 445. When a clamp pin is inserted into the clamp pin holes 445 and tightened, the protrusions 440 forcibly compress towards each other, thereby reducing the width of the separation 430 and (accordingly) the circumference of the inside surface of the reciprocal cavity of the outer sleeve component 320, enacting a friction force on the cylindrical shaft 312 and securing the inner rotating component 310 into a fixed position relative to the outer sleeve component 320. When the clamp pin is loosened, the width of the separation 430 is increased, thereby increasing the circumference of the inside surface of the reciprocal cavity of the outer sleeve component 320, allowing the inner rotating component 310 to rotate in a horizontal plane relative to the outer sleeve component 320. In one embodiment, the clamp pin is a turntable handscrew while in other embodiments the clamp pin is a threaded screw, a rod, a clip, or other suitable device.

FIGS. 5 and 6 illustrate a second locking mechanism for the swivel camera mount described herein, according to one embodiment. The swivel mount component 500 includes an inner rotating component 510 and an outer sleeve component 520. In some embodiments, the inner rotating component 510 and the outer sleeve component 520 are the inner rotating component 310 and the outer sleeve component 320 as described above. In the embodiment of FIG. 5, a locking screw 530 is illustrated in a locked configuration, inserted perpendicularly into a reciprocal screw hole in an outer surface of the outer sleeve component 520 aligned with a tapered groove shaft within the inner rotating component 510. In the locked configuration, the locking screw 530 securely abuts the tapered groove shaft within the inner rotating component, fixedly securing the inner rotating component 510 relative to the outer sleeve component 520. The locking screw can be loosened into a loosened configuration, allowing the inner rotating component 510 to rotate in a horizontal plane relative to the outer sleeve component 520.

FIG. 6 illustrates a tapered groove shaft 605 within the inner rotating component 510, a threaded aperture 610 within an outer surface of the outer sleeve component 520, and a locking screw 530 which includes a screw handle 620 and a screw thread 615. When the inner rotating component 510 is inserted within a reciprocal cavity 608 of the outer sleeve component 520, the tapered groove shaft 605, which includes a "V"-shaped indentation around the circumference of the inner rotating component 510, is aligned with the threaded aperture 610. When the screw 530 is inserted into the threaded aperture 610 in a locked configuration, the screw thread 615 can be tightened such that the screw thread 615 forcibly abuts the "V"-shaped indentation of the tapered groove shaft 605, creating friction between the screw thread 615 and the tapered groove shaft 605 and fixedly securing the inner rotating component 510 relative to the outer sleeve component 520. In some embodiments, the screw thread 615 includes a "V"-shaped end 618 configured to align with the "V"-shaped indentation of the tapered groove shaft 605 when the screw 530 is configured into the locked configuration.

In some embodiments, illustrated herein), the swivel mount component 500 includes a threaded locking component. When a locking mechanism (e.g. locking pin, locking screw) is inserted into the pin holes 445 and tightened, the protrusions 440 forcibly compress towards each other, thereby reducing the width of the separation 430 and (accordingly) the circumference of the inside surface of the reciprocal cavity of the outer sleeve component 320. The swivel mount component 500 can include a horizontal groove within the cylindrical shaft 312 through which the locking mechanism at least partially passes when inserted into the pin holes 445. By passing through the horizontal groove within the cylindrical shaft 312, the locking mechanism prevents the removal of the inner rotating component 310 from the outer sleeve component 320. In various embodiments the locking mechanism may be made of metal, a plastic polymer, or the like. Additionally, the fastening portion of the locking mechanism can be a thumb screw, a hexagonal screw, or any suitable fastening device.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera mounting system, comprising:
   an upper mount component configured to at least partially securely enclose a camera, the upper mount component comprising a first plurality of protrusions extending from a bottom surface of the upper mount component; and
   a lower mount component, the lower mount component including:
       an inner rotating component comprising a second plurality of protrusions and a cylindrical shaft, the second plurality of protrusions configured to interlock with the first plurality of protrusions of the upper mount component, pivotally coupling the upper mount component to the lower mount component, the cylindrical shaft comprising a tapered groove;
       an outer sleeve component configured to at least partially enclose the cylindrical shaft such that the cylindrical shaft can rotate relative to the outer sleeve component, the outer sleeve component comprising an opening aligned with the tapered groove, the outer sleeve component comprising a third plurality of protrusions and a shaft receptacle, the third plurality of protrusions configured to interlock with a forth plurality of protrusions of a base mount, pivotally coupling the lower mount component to the base mount; and a screw component configured for insertion into the opening in a locked configuration such that the screw component abuts a surface of the tapered groove, thereby securing the inner rotating component relative to the outer sleeve component.

2. The mounting system of claim 1, wherein the upper mount component comprises:

a camera housing including a front face, a top face, a bottom face, a left side face, a right side face, and a back door, the faces and the door structured to enclose the camera when the door is in a closed position;

a hinge structure pivotally coupling a bottom edge of the housing and the back door of the housing;

a first fastening structure located on the top face of the camera housing;

a second fastening structure located on a top edge of the back door, the second fastening structure for detachably coupling to the first fastening structure such that the back door of the camera housing is secured to the housing in the closed position when the first fastening structure is coupled to the second fastening structure, and wherein the camera is removable from the housing when the first fastening structure is unsecured from the second fastening structure.

3. The mounting system of claim 2, wherein the camera housing comprises a waterproof seal such that the housing is waterproof when the back door is secured in the closed position.

4. The mounting system of claim 1, wherein the upper mount component securely encloses a camera configured to record either images or video footage.

5. The mounting system of claim 1, wherein the upper mount component and lower mount component are rotatable about a pin when the pin is in a first loosened position and wherein the upper mount component and lower mount component are secured at a fixed angle when the pin is in a second secured position.

6. The mounting system of claim 5, wherein the pin comprises a turnable screw, wherein the pin is in the first position when the screw is loosened, and wherein the pin is in the second position when the screw is tightened.

7. The mounting system of claim 5, wherein each of the first plurality of protrusions includes a pinhole forming a first set of pinholes, wherein each of the second plurality of protrusions includes a pinhole forming a second set of pinholes, wherein the first set of pinholes and the second set of pinholes are aligned, and wherein the pin is inserted into the aligned first set of pinholes and second set of pinholes, coupling the upper mount component to the lower mount component.

8. The mounting system of claim 1, wherein the lower mount component and base mount are rotatable about a pin when the pin is in a first loosened position and wherein the lower mount component and base mount are secured at a fixed angle when the pin is in a second secured position.

9. The mounting system of claim 8, wherein the pin comprises a turnable screw, wherein the pin is in the first position when the screw is loosened, and wherein the pin is in the second position when the screw is tightened.

10. The mounting system of claim 1, wherein the cylindrical shaft is configured to:

rotate at least 360 degrees within a horizontal plane parallel to the outer sleeve component.

11. The mounting system of claim 1, wherein the outer sleeve component is configured to:

pivot up to 90 degrees within one or more vertical planes relative to the base component.

12. A camera mounting system, comprising:

an upper mount component configured to at least partially securely enclose a camera, the upper mount component comprising a first plurality of protrusions extending from a bottom surface of the upper mount component; and a lower mount component, the lower mount component including:

an inner rotating component comprising a second plurality of protrusions and a cylindrical shaft, the second plurality of protrusions configured to interlock with the first plurality of protrusions of the upper mount component, pivotally coupling the upper mount component to the lower mount component, the cylindrical shaft comprising a tapered groove;

an outer sleeve component configured to at least partially enclose the cylindrical shaft such that the inner rotating component can rotate relative to the outer sleeve component when the camera mounting system is configured in an unlocked configuration, the outer sleeve component comprising an opening aligned with the tapered groove; and a screw component configured for insertion into the opening when the camera mounting system is configured in a locked configuration such that the screw component abuts a surface of the tapered groove, thereby securing the inner rotating component relative to the outer sleeve component.

13. The mounting system of claim 12, wherein the upper mount component comprises:

a camera housing including a front face, a top face, a bottom face, a left side face, a right side face, and a back door, the faces and the door structured to enclose the camera when the door is in a closed position;

a hinge structure pivotally coupling a bottom edge of the housing and the back door of the housing;

a first fastening structure located on the top face of the camera housing;

a second fastening structure located on a top edge of the back door, the second fastening structure for detachably coupling to the first fastening structure such that the back door of the camera housing is secured to the housing in the closed position when the first fastening structure is coupled to the second fastening structure, and wherein the camera is removable from the housing when the first fastening structure is unsecured from the second fastening structure.

14. The mounting system of claim 13, wherein the camera housing comprises a waterproof seal such that the housing is waterproof when the back door is secured in the closed position.

15. The mounting system of claim 12, wherein the cylindrical shaft is configured to:

rotate at least 360 degrees within a horizontal plane parallel to the outer sleeve component when the camera mounting system is configured in the unlocked configuration.

16. A camera mounting system, comprising:

an inner rotating component comprising a shaft with a tapered groove;

an outer sleeve component configured to at least partially enclose the shaft such that the inner rotating component can rotate relative to the outer sleeve component when the camera mounting system is configured in an unlocked configuration, the outer sleeve component comprising an opening aligned with the tapered groove; and a screw component configured for insertion into the opening when the camera mounting system is configured in a locked configuration such that the screw component abuts a surface of the tapered groove, thereby securing the inner rotating component relative to the outer sleeve component.

17. The mounting system of claim 16, wherein the inner rotating component further comprises a coupling mechanism configured to couple to a camera housing.

18. The mounting system of claim 17, wherein the camera housing is configured to securing enclose a camera.

19. The mounting system of claim 17, wherein the camera housing is waterproof.

20. The mounting system of claim 16, wherein the shaft is configured to:

rotate at least 360 degrees within a horizontal plane parallel to the outer sleeve component when the camera mounting system is configured in the unlocked configuration.

\* \* \* \* \*